UNITED STATES PATENT OFFICE.

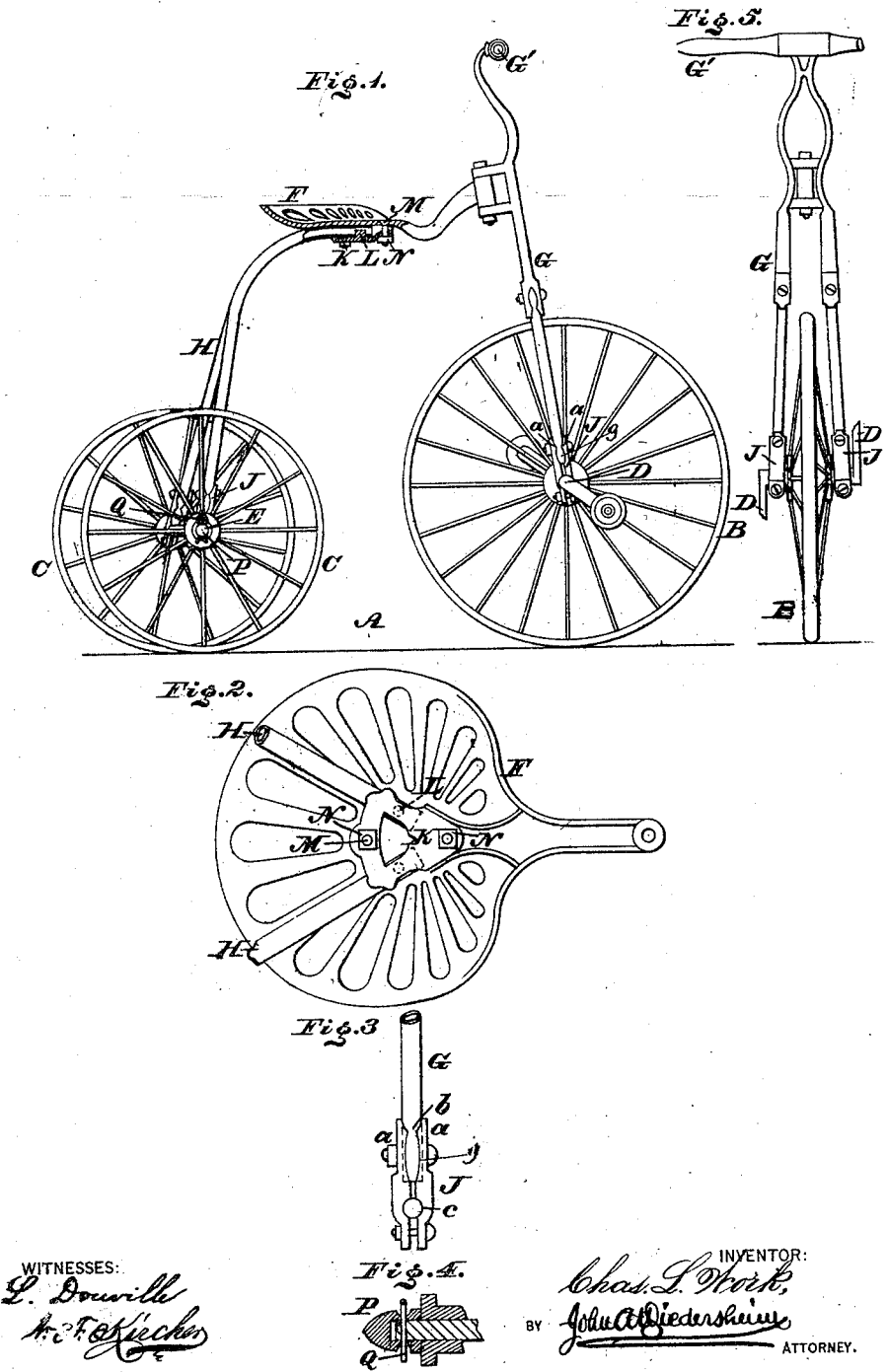

CHARLES L. WORK, OF PHILADELPHIA, PENNSYLVANIA.

VELOCIPEDE.

SPECIFICATION forming part of Letters Patent No. 248,545, dated October 18, 1881.

Application filed July 29, 1881. (No model.)

*To all whom it may concern:*

Be it known that I, CHARLES L. WORK, a citizen of the United States, residing at Philadelphia, in the county of Philadelphia, State of Pennsylvania, have invented a new and useful Improvement in Velocipedes, which improvement is fully set forth in the following specification and accompanying drawings, in which—

Figure 1 is a perspective view, partly sectional, of the velocipede embodying my invention. Fig. 2 is a bottom view of the connection of the reach and seat enlarged. Fig. 3 is a view of a detached portion. Fig. 4 is a section of the axle and fastening devices of the wheel. Fig. 5 is a front view of a portion of the velocipede.

Similar letters of reference indicate corresponding parts in the several figures.

This invention relates to velocipedes; and it consists, first, of the standard, in combination with the crank-axle and the clips, each of which is made in two parts clamped together, and provided with a vertical groove to receive the ends of said standard; second, of the reaches, in combination with the axle and the sectional clips, each of which has a groove to receive the lower ends of said reaches, in order that said parts may be securely clamped together; third, of a velocipede-frame, in combination with the axles and wheels thereof and sectional clips connecting said frame to said axles, the said clips and the attached parts of said frame being of interlocking shape; fourth, of the seat and reaches, in combination with a bracket fastened to said seat, said bracket being grooved on its inner face to receive the inner ends of said reaches; fifth, of the reaches and seat, in combination with a bracket bolted to said seat, having grooves on its inner face, and lugs which enter openings in said reaches; sixth, in a velocipede, a seat which is in one piece with an arm or bar hinged directly to the standard, all substantially as hereinafter set forth.

Referring to the drawings, A represents the velocipede, consisting of the front wheel, B, the hind wheels, C, the crank-axle D, the rear axle, E, the seat F, the forked standard G, with tiller G', and the reaches H, the seat being pivoted to the top of the standard G, and the reaches secured to the seat and sustained on the rear axle, E.

J represents clips adapted to connect the standard G and front wheel and the reaches H and rear wheels, respectively. Each clip consists of two parts, *a a*, the inner faces of which have vertical grooves or depressions *b* at the top and transverse grooves *c* near the bottom. The bottoms of the forks of the standard G enter the vertical grooves of the clips, and the journal of the crank-axle is fitted in the transverse groove of the clips, and when the two-part clips are bolted or screwed together the standard and front wheel are firmly connected, and the crank-axle has its journal-bearings in said clips. The clips for the rear wheels and reaches are constructed similarly to those for the front wheel, and are clamped to the lower ends of the reaches and to the rear axle as the bearings of the axle, thus forming convenient and reliable means of securing the reaches and hind wheels and sustaining the rear axle in position.

The reaches H extend from the rear axle to the seat in a line somewhat perpendicular, and then curve inwardly to the seat. By this construction I provide a light and simple frame for the velocipede and bring the strain in a perpendicular direction on the rear axle, thus preventing springing of the reaches or frame. The upper ends of the reaches converge, and are united to the under side of the seat by means of a bracket, K, whose inner face is grooved to receive the converging ends of the reaches, and formed with studs L, which enter openings in the reaches. Bolts or screws M are passed through the bracket and seat and provided with nuts N, which, when tightened, secure the bracket to the seat and clamp the ends of the reaches to the seat, thus firmly connecting the seat and reaches.

The standards G and reaches H are formed of metallic tubes, which lighten and strengthen the velocipede, and as the rear axle has two wheels, I provide a simple and inexpensive velocipede, every part of which may be formed of metal, in the present case, however, the tiller and foot-rests of the crank-axle being made of wood. Each journal of the axle has fitted on its outer end a cap, P, whose diameter is larger than the inner diameter of the hub of the wheel. A key, Q, is passed through the cap and journal, thus securing the cap and retaining the wheel on the axle by simple means. By withdrawing the key and displacing the cap the wheel may be conveniently removed.

Having thus described my invention, what I claim as new, and desire to secure by Letters Patent, is—

1. The standard G, in combination with crank-axle e, and the clips J, each of which is made in two parts, a a, clamped together, and provided with a vertical groove to receive the ends of said standard, substantially as set forth.

2. The reaches H, in combination with the axle and the sectional clips J, each of which has a groove to receive the lower ends of said reaches, in order that said parts may be securely clamped together.

3. A velocipede-frame, in combination with the axles and wheels thereof, and sectional clips connecting said frame to said axles, the said clips and the attached parts of said frame being of interlocking shape, substantially as described.

4. Seat F and reaches H, in combination with a bracket, K, fastened to said seat, said bracket being grooved on its inner face to receive the inner ends of said reaches, substantially as set forth.

5. The reaches H and seat F, in combination with a bracket bolted to said seat, having grooves on its inner face, and lugs L, which enter openings in said reaches, substantially as set forth.

6. In a velocipede, a seat which is in one piece with an arm or bar hinged directly to the standard, substantially as set forth.

CHAS. L. WORK.

Witnesses:
JOHN A. WIEDERSHEIM,
W. F. KIRCHER.